United States Patent
Shoshi et al.

(10) Patent No.: US 6,841,272 B2
(45) Date of Patent: Jan. 11, 2005

(54) FILM FOR OPTICAL APPLICATIONS

(75) Inventors: Satoru Shoshi, Koshigaya (JP); Yutaka Onozawa, Kawagoe (JP); Shigenobu Maruoka, Tatuno (JP); Yoshitaka Takesako, Toda (JP)

(73) Assignee: Lintec Corporation, Tokyo (JP)

( * ) Notice: Subject to any disclaimer, the term of this patent is extended or adjusted under 35 U.S.C. 154(b) by 61 days.

(21) Appl. No.: 10/278,273

(22) Filed: Oct. 23, 2002

(65) Prior Publication Data

US 2003/0104188 A1 Jun. 5, 2003

(30) Foreign Application Priority Data

Nov. 7, 2001 (JP) ........................................ 2001-342183

(51) Int. Cl.$^7$ ............................ B32B 7/02; B32B 3/12; B32B 19/00; G02B 1/10; G02B 5/08

(52) U.S. Cl. .................... 428/697; 428/159; 428/195.1; 428/212; 428/213; 428/220; 428/332; 428/688; 428/689; 428/702; 359/585; 359/586; 359/883

(58) Field of Search ................................ 428/195.1, 213, 428/159, 212, 220, 332, 688, 689, 697, 702, 195; 359/883, 585, 586; 349/113

(56) References Cited

U.S. PATENT DOCUMENTS

| 6,104,530 | A | | 8/2000 | Okamura et al. |
| 6,254,996 | B1 | * | 7/2001 | Fukuda et al. ............... 428/480 |
| 6,436,541 | B1 | | 8/2002 | Sopko et al. |
| 6,480,250 | B1 | * | 11/2002 | Matsufuji et al. ........... 349/113 |
| 6,502,943 | B2 | * | 1/2003 | Nakamura et al. .......... 359/603 |
| 2002/0110692 | A1 | | 8/2002 | Suzuki et al. |
| 2002/0127408 | A1 | | 9/2002 | Nishida et al. |
| 2002/0176169 | A1 | | 11/2002 | Shoshi et al. |
| 2002/0187324 | A1 | | 12/2002 | Shoshi et al. |
| 2003/0118532 | A1 | | 6/2003 | Taniguchi et al. |

* cited by examiner

*Primary Examiner*—B. Hamilton Hess
*Assistant Examiner*—Lawrence Ferguson
(74) *Attorney, Agent, or Firm*—Frishauf, Holtz, Goodman & Chick, P.C.

(57) ABSTRACT

A film for optical applications comprising (A) a hard coat layer which comprises a metal oxide and a substance cured by heat or by an ionizing radiation and has a thickness in a range of 2 to 20 μm and (B) a low refractivity layer which comprises porous silica and a polysiloxane-based polymer and has a refractive index in a range of 1.30 to 1.45 and a thickness in a range of 40 to 200 nm, layers (A) and (B) being successively laminated at least on one face of a substrate film. The film exhibits an excellent property for preventing reflection of light and excellent scratch resistance and can be produced at a low cost.

20 Claims, No Drawings

FILM FOR OPTICAL APPLICATIONS

BACKGROUND OF THE INVENTION

1. Field of the Invention

The present invention relates to a film for optical applications and, more particularly, to a film for optical applications which effectively prevents reflection of light in a wide range of wavelength at the surface of image display devices such as plasma displays (PDP), cathode ray tubes (CRT) and liquid crystal displays (LCD), exhibits excellent scratch resistance, has a simple layer construction and can be produced at a low cost.

2. Description of Related Art

When a display such as PDP, CRT and LCD is used, light from the outside is occasionally reflected at the surface of the display and difficulty arises in watching images on the display. In particular, as the size of flat panel displays increases recently, solving the above problem is becoming more important.

To solve the above problem, various treatments for preventing reflection of light and anti-glare treatments have been made on various display devices. As one of such treatments, a film for preventing reflection of light is used for various display devices.

The film for preventing reflection of light has heretofore been prepared in accordance with a dry process such as vapor deposition and sputtering. A thin film of a substance having a low refractive index such as $MgF_2$ is formed on a substrate film or layers of a substance having a high refractive index such as ITO (indium oxide doped with tin) and $TiO_2$ and layers of a substance having a low refractive index such as $MgF_2$ and $SiO_2$ are alternately laminated. However, the film for preventing reflection of light prepared in accordance with the dry process has a drawback in that the cost of production is high.

Recently, preparation of a film for preventing reflection of light in accordance with a wet process, i.e., a coating process, has been attempted. However, the film for preventing reflection of light prepared in accordance with the wet process has a drawback in that scratch resistance of the surface of the prepared film is inferior to that of the film prepared in accordance with the dry process.

SUMMARY OF THE INVENTION

The present invention has an object of providing a film for optical applications which effectively prevents reflection of light at the surface of image display devices such as PDP, CRT and LCD, exhibits excellent scratch resistance and can be produced at a low cost.

As the result of extensive studies by the present inventors on the film for preventing reflection of light which exhibited an excellent property of preventing reflection of light and excellent scratch resistance and could be produced at a low cost, it was found that a film for preventing reflection of light which was formed by successively laminating a hard coat layer and a low refractivity layer each having specific properties and thicknesses and, optionally, an antifouling coating layer on a substrate film in accordance with a wet process exhibited an excellent property of preventing reflection of light in a wide range of wavelength and excellent scratch resistance, had a simple layer construction, could be produced at a low cost and could be used advantageously for achieving the above object. The present invention has been completed based on the knowledge.

The present invention provides:

(1) A film for optical applications comprising (A) a hard coat layer which comprises a metal oxide and a substance cured by heat or by an ionizing radiation and has a thickness in a range of 2 to 20 $\mu$m and (B) a low refractivity layer which comprises porous silica and a polysiloxane-based polymer and has a refractive index in a range of 1.30 to 1.45 and a thickness in a range of 40 to 200 nm, layers (A) and (B) being successively laminated at least on one face of a substrate film;

(2) A film described in (1), wherein the porous silica in layer (B) has a specific gravity of 1.7 to 1.9, a refractive index of 1.30 to 1.36 and an average particle diameter of 30 to 80 nm;

(3) A film described in any one of (1) and (2), wherein the metal oxide in layer (A) comprises at least one compound selected from tin oxide doped with antimony and zinc antimonate;

(4) A film described in any one of (1) to (3), wherein the hard coat layer of layer (A) is a hard coat layer having an anti-glare property;

(5) A film described in any one of (1) to (4), wherein the low refractivity layer of layer (B) has an antistatic property; and (6) A film described in any one of (1) to (5), which further comprises (C) an antifouling coating layer disposed on layer (B).

DESCRIPTION OF THE PREFERRED EMBODIMENTS

The film for optical applications of the present invention is a film for preventing reflection of light which is prepared in accordance with a wet process and has a structure comprising (A) a hard coat layer and (B) a low refractivity layer which are successively laminated at least on one face of a substrate film and, optionally, (C) an antifouling coating layer disposed on layer (B).

The substrate film used for the film for optical applications of the present invention is not particularly limited and can be suitably selected from conventional plastic films heretofore used as the substrate for films for preventing reflection of light in optical applications. Examples of the plastic film include films of polyesters such as polyethylene terephthalate, polybutylene terephthalate and polyethylene naphthalate, polyethylene films, polypropylene films, cellophane, diacetylcellulose films, triacetylcellulose films, acetylcellulose butyrate films, polyvinyl chloride films, polyvinylidene chloride films, polyvinyl alcohol films, ethylene-vinyl acetate copolymer films, polystyrene films, polycarbonate films, polymethylpentene films, polysulfone films, polyether ether ketone films, polyether sulfone films, polyether imide films, polyimide films, fluororesin films, polyamide films and acrylic resin films.

The substrate film may be transparent or translucent and may be colored or colorless. These properties of the substrate film can be suitably selected in accordance with the application. For example, when the film is used as a protective film of a liquid crystal display, a colorless transparent film is preferable as the substrate film.

The thickness of the substrate film is not particularly limited and suitably selected in accordance with the situation. The thickness is, in general, in the range of 15 to 250 $\mu$m and preferably in the range of 30 to 200 $\mu$m. One or both surfaces of the substrate film may be treated, for example, by oxidation or by a treatment of forming rough surfaces, where desired, so that adhesion with layers disposed on the surfaces is enhanced. Examples of the treatment of the surface by oxidation include the treatment by corona discharge, the treatment by chromic acid (a wet process), the treatment by flame, the treatment by heated air and the irradiation by ultraviolet light in the presence of ozone. Examples of the treatment of forming rough surfaces include the treatment by sand blasting and the treatment with a solvent. The surface treatment is suitably selected in accordance with the type of the substrate film. In general, the treatment by corona discharge is preferable from the standpoint of the effect and the operability. The substrate film may be treated by forming a primer on one or both faces thereof.

In the film for optical applications of the present invention, the hard coat layer of layer (A) which comprises a metal oxide and a substance cured by heat or by an ionizing radiation is disposed as the first layer at least on one face of the substrate film. It is preferable that the hard coat layer has the anti-glare property. Therefore, as the metal oxide, a metal oxide which provides the anti-glare property and enhances adhesion with the low refractivity layer of layer (B) formed on layer (A) is preferable. The metal oxide is not limited as long as the metal oxide has the above property. Fine particles of tin oxide doped with antimony and/or zinc antimonate are preferable. The average diameter of the fine particles is, in general, about 1 to 60 nm.

In the present invention, the hard coat layer of layer (A) comprises the fine particles of tin oxide doped with antimony and/or zinc antimonate as the metal oxide described above and, where necessary, may also comprise particles of another metal oxide providing the anti-glare property. As the particles of another metal oxide providing the anti-glare property, particles of a suitable metal oxide can be selected from particles of metal oxides which are heretofore known to provide the anti-glare properties. Examples of the metal oxide include silica particles having an average particle diameter in the range of about 0.5 to 10 μm and aggregates of particles of colloidal silica with an amine compound which have an average particle diameter in the range of about 0.5 to 10 μm. The amount of the metal oxide in the hard coat layer can be suitably selected based on the consideration on the anti-glare property, the property preventing reflection and the scratch resistance of the obtained film for optical applications. In general, the amount is selected in the range of 1 to 4 parts by weight per 1 part by weight of the substance cured by heat or by an ionizing radiation.

The hard coat layer of layer (A) comprises the above metal oxide and a substance cured by heat or a substance cured by an ionizing radiation. As the substance cured by heat, substances comprising a silicon compound having a siloxane bond such as inorganic silica-based compound (including polysilicic acid) and/or a polyorganosiloxane-based compound as the main component are preferable.

The inorganic silica-based compound, the polyorganosiloxane-based compound or a mixture of these compounds can be obtained by preparing a material for forming the hard coat layer in accordance with a conventional process, followed by curing the prepared material by heating.

As the process for preparing the material for forming the hard coat layer, for example, a process of partially or completely hydrolyzing and polycondensing an alkoxysilane compound represented by general formula [1]:

$$R^1{}_n Si(OR^2)_{4-n} \quad [1]$$

using an inorganic acid such as hydrochloric acid and sulfuric acid or an organic acid such as oxalic acid and acetic acid is preferable. In general formula [1], $R^1$ represents a group which is not hydrolyzed such as an alkyl group; a substituted alkyl group, the substituent being a halogen atom, epoxy group or (meth)acryloyloxy group; an alkenyl group; an aryl group; and an aralkyl group. $R^2$ represents a lower alkyl group and n represents 0 or an integer of 1 to 3. A plurality of $R^1$ may represent the same group or different groups when the plurality of $R^1$ are present and a plurality of $OR^2$ may represent the same group or different groups when the plurality of $OR^2$ are present.

When a tetraalkoxysilane, i.e., a compound represented by general formula [1] in which n represents 0, is completely hydrolyzed, an inorganic silica-based material for forming the hard coat layer is obtained. When a tetraalkoxysilane is partially hydrolyzed, a polyorganosiloxane-based material for forming the hard coat layer or a material for forming the hard coat layer as a mixture of inorganic silica-based compounds and polyorganosiloxane-based compounds is obtained. When a compound represented by general formula [1] in which n represents 1 to 3 is partially or completely hydrolyzed, a polyorganosiloxane-based material for forming the hard coat layer is obtained since such a compound has a group which is not hydrolyzed. A suitable solvent may be used for the hydrolysis so that the hydrolysis can be conducted uniformly.

Examples of the alkoxysilane compound represented by general formula [1] include tetramethoxysilane, tetraethoxysilane, tetra-n-propoxysilane tetraisopropoxysilane, tetra-n-butoxysilane, tetra-isobutoxysilane, tetra-sec-butoxysilane, tetra-tert-butoxysilane, methyltrimethoxysilane, methytriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, γ-glycidoxypropyltrimethoxysilane, γ-acryloyloxypropyltrimethoxysilane, γ-methacryloyloxypropyltrimethoxysilane, dimethyldimethoxysilane, methylphenyldimethoxysilane, vinyltrimethoxysilane, vinyltriethoxysilane, divinyldimethoxysilane, divinyldiethoxysilane, trivinylmethoxysilane and trivinylethoxysilane. The alkoxysilane compound may be used singly or in combination of two or more.

In the above process, where necessary, an aluminum compound such as aluminum chloride and a trialkoxyaluminum may be added in a suitable amount.

As another process, using a silicon compound such as sodium meta-silicate, sodium ortho-silicate and water glass (a mixture of sodium silicates) as the raw material, the silicon compound may be hydrolyzed with an acid such as hydrochloric acid, sulfuric acid and nitric acid or a metal compound such as magnesium chloride and calcium sulfate. Free silicic acid is formed by the hydrolysis. This compound is easily polymerized and a mixture of linear compounds, cyclic compounds and network compounds is obtained. The composition of the mixture is different depending on the type of the material. Polysilicic acid obtained from water glass contains as the major components compounds having linear structures represented by general formula [2]:

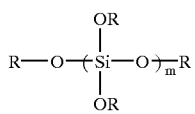

[2]

wherein m represents the degree of polymerization and R represents hydrogen atom, silicon atom or a metal atom such as magnesium atom and aluminum atom.

Completely inorganic silica-based material for forming the hard coat layer can be obtained as described above. As the inorganic silica-based material for forming the hard coat layer, silica gel ($SiO_x \cdot nH_2O$) can also be used.

The hard coat layer comprising the metal oxide and the substance cured by heat can be formed by preparing a coating fluid containing the particles of the metal oxide described above and the material for forming the hard coat layer obtained as described above, applying the prepared coating fluid to at least one face of the substrate in accordance with a conventional process such as the bar coating process, the knife coating process, the roll coating process, the blade coating process, the die coating process and the gravure coating process and curing the formed coating layer by heating at a temperature of about 80 to 150° C.

The hard coat layer comprising the metal oxide and the substance cured by an ionizing radiation can be formed, for example, by applying a coating fluid comprising a compound curable by an ionizing radiation, the particles of a metal oxide described above and, where desired, a photo-polymerization initiator to at least one face of the substrate to form a coating layer and curing the formed coating layer by irradiation with an ionizing radiation.

Examples of the above compound curable by an ionizing radiation include photopolymerizable prepolymers and/or photopolymerizable monomers. The photopolymerizable prepolymer include prepolymers of the radical polymerization type and prepolymers of the cationic polymerization type. Examples of the prepolymer of the radical polymerization type include prepolymers of polyester acrylates, prepolymers of epoxy acrylates, prepolymers of urethane acrylates and prepolymers of polyol acrylates. The prepolymer of a polyester acrylate can be obtained, for example, by obtaining a polyester oligomer having hydroxyl groups at both ends by condensation of a polyfunctional carboxylic acid with a polyhydric alcohol, followed by esterification of the hydroxyl groups in the obtained oligomer with (meth)acrylic acid; or by obtaining an oligomer having hydroxyl groups at both ends by addition of an alkylene oxide to a polyfunctional carboxylic acid, followed by esterification of the hydroxyl groups of the obtained oligomer with (meth)acrylic acid. The prepolymer of an epoxy acrylate can be obtained, for example, by esterification of oxirane rings in an epoxy resin of a bisphenol type or a novolak type having a relatively low molecular weight by the reaction with (meth)acrylic acid. The prepolymer of a urethane acrylate can be obtained, for example, by obtaining a polyurethane oligomer by the reaction of a polyether polyol or a polyester polyol with a polyisocyanate, followed by esterification of the obtained oligomer with (meth)acrylic acid. The prepolymer of a polyol acrylate can be obtained, for example, by esterification of hydroxyl groups in a polyether polyol with (meth)acrylic acid. The above photopolymerizable prepolymers may be used singly or in combination of two or more.

As the photopolymerizable prepolymer of the cationic polymerization type, in general, epoxy resins are used. Examples of the epoxy resin include compounds obtained by epoxidation of polyhydric phenols such as bisphenol resins and novolak resins with epichlorohydrin and compounds obtained by oxidation of linear olefin compounds and cyclic olefin compounds with peroxides.

Examples of the photopolymerizable monomer include polyfunctional acrylates such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol hydroxypivalate di(meth)acrylate, dicyclopentanyl di(meth)acrylate, dicyclopentenyl di(meth)acrylate modified with caprolactone, di(meth)acrylate of phosphoric acid modified with ethylene oxide, cyclohexyl di(meth)acrylate substituted with allyl group, isocyanurate di(meth)acrylate, trimethylolpropane tri(meth)acrylate, dipentaerythritol tri(meth)acrylate, dipentaerythritol tri(meth)acrylate modified with propionic acid, pentaerythritol tri(meth)acrylate, trimethylolpropane tri(meth)acrylate modified with propylene oxide, tris(acryloxyethyl) isocyanurate, dipentaerythritol penta(meth)acrylate modified with propionic acid, dipentaerythritol hexa(meth)acrylate and dipentaerythritol hexa(meth)acrylate modified with caprolactone. The above photopolymerizable monomers may be used singly or in combination of two or more. The photopolymerizable monomer may be used in combination with the photopolymerizable prepolymer described above.

Examples of the photopolymerization initiator for the photopolymerizable prepolymers and the photopolymerizable monomers of the radical polymerization type, which is used where desired, include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholinopropane-1-one, 4-(2hydroxyethoxy)phenyl 2-(hydroxy-2-propyl) ketone, benzophenone, p-phenylbenzophenone, 4,4'-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and p-dimethylaminobenzoates. Examples of the photopolymerization initiator for the photopolymerizable prepolymers of the cationic polymerization type include compounds composed of oniums such as aromatic sulfonium ions, aromatic oxosulfonium ions and aromatic iodonium ions and anions such as tetrafluoroborates, hexafluorophosphates, hexafluoroantimonates and hexafluoroarsenates. The above photopolymerization initiators may be used singly or in combination of two or more. The amount is selected, in general, in the range of 0.2 to 10 parts by weight per 100 parts by weight of the photopolymerizable prepolymer, the photopolymerizable monomer or both compounds.

The coating fluid for forming the hard coat layer used in the present invention can be prepared by adding the above compound curable by irradiation with an ionizing radiation, the particles of a metal oxide described above and, where desired, the above photopolymerization initiator and various additives such as antioxidants, ultraviolet light absorbents, light stabilizers, leveling agents and defoaming agents in each specific amount to a suitable solvent which is used where necessary, followed by dissolving or dispersing the added components in the solvent.

Examples of the solvent used in the above preparation include aliphatic hydrocarbons such as hexane, heptane and cyclohexane, aromatic hydrocarbons such as toluene and xylene, halogenated hydrocarbons such as methylene chloride and ethylene chloride, alcohols such as methanol, ethanol, propanol and butanol, ketones such as acetone, methyl ethyl ketone, 2-pentanone and isophorone, esters such as ethyl acetate and butyl acetate and cellosolve solvents such as ethylcellosolve.

The concentration and the viscosity of the coating fluid thus prepared are not particularly limited as long as the coating fluid can be used for coating and can be suitably selected in accordance with the situation.

The prepared coating fluid is applied to one face of the substrate film in accordance with a conventional process such as the bar coating process, the knife coating process, the roll coating process, the blade coating process, the die coating process and the gravure coating process and a coating layer is formed. The formed coating layer is dried and cured by irradiation with an ionizing radiation and the hard coat layer is formed.

Examples of the ionizing radiation include ultraviolet light and electron beams. The ultraviolet light can be obtained by using a high voltage mercury lamp, a fusion H lamp or a xenon lamp. The electron beams can be obtained by using an electron beam accelerator. Among these ionizing radiations, ultraviolet light is preferable. When the electron beams are used, the cured film can be obtained without adding polymerization initiators.

The thickness of the hard coat layer of layer (A) thus formed is in the range of 2 to 20 μm. When the thickness is smaller than 2 μm, there is the possibility that scratch resistance of the obtained film for optical applications is not sufficiently exhibited. When the thickness exceeds 20 μm, there is the possibility that cracks are formed in the hard coat layer. It is preferable that the thickness of the hard coat layer is in the range of 3 to 15 μm and more preferably in the range of 5 to 10 μm.

In the film for optical applications of the present invention, the refractive index of the hard coat layer of layer (A) is, in general, in the range of 1.50 to 1.75 and preferably in the range of 1.60 to 1.70.

In the film for optical applications of the present invention, a low refractivity layer of layer (B) is formed on the hard coat layer formed above.

The low refractivity layer comprises porous silica and a polysiloxane-based polymer and has a refractive index in the range of 1.30 to 1.45 and a thickness in the range of 40 to 200 nm. When the refractive index or the thickness is outside the above range, it is difficult that the film for optical applications having the excellent property for preventing reflection and the excellent scratch resistance is obtained.

As the porous silica used in layer (B), fine particles of porous silica having a specific gravity in the range of 1.7 to 1.9, a refractive index in the range of 1.30 to 1.36 and an average particle diameter in the range of 30 to 80 nm are preferable. The amount of the porous silica in layer (B) is not particularly limited as long as the refractive index of layer (B) is in the above range. From the standpoint of the property for forming a film and the scratch resistance, in general, the amount is selected in the range of 1 to 2 parts by weight per 1 part by weight of the polysiloxane-based polymer.

As the polysiloxane-based polymer comprised in layer (B), inorganic silica-based compounds, polyorganosiloxane-based compounds and mixtures of these compounds which are the same as the corresponding compounds described in the substance cured by heat in the hard coat layer of component (A) are used. Therefore, the desired polysiloxane-based polymer can be obtained by treating a material which is the same as that described as the example of the material for forming the hard coat layer by heating.

In the present invention, the low refractive layer of layer (B) comprising the porous silica and the polysiloxane-based polymer can be formed by preparing a coating fluid comprising the particles of porous silica and the material which is the same as the material for forming the hard coat layer described above, applying the prepared coating fluid in accordance with a conventional process such as the bar coating process, the knife coating process, the roll coating process, the blade coating process, the die coating process and the gravure coating process to the hard coat layer of layer (A) to form a coating layer and heating the formed coating layer at a temperature of about 80 to 150° C.

It is preferable that, in the low refractivity layer comprising the porous silica and the polysiloxane-based polymer formed as described above, the siloxane-based polymer has silanol group or other hydrophilic groups since the antistatic property is provided and attachment of dusts to the obtained film for optical applications can be suppressed.

In the film for optical applications of the present invention, where desired, (C) an antifouling coating layer can be disposed on the low refractivity layer of layer (B). The antifouling coating layer can be formed, in general, by applying a coating fluid comprising a fluorine-based resin to the low refractivity layer of layer (B) in accordance with a conventional process such as the bar coating process, the knife coating process, the roll coating process, the blade coating process, the die coating process and the gravure coating process to form a coating layer, followed by the drying treatment.

The thickness of the antifouling coating layer is, in general, in the range of 1 to 10 nm and preferably in the range of 3 to 8 nm. Due to the antifouling coating layer, the surface of the obtained film for optical applications is provided with an improved slipping property and fouling of the surface is suppressed.

When the hard coat layer is formed on one face of the substrate in the film for optical applications of the present invention, an adhesive layer for adhering the film for optical applications to an adherend such as a liquid display device may be formed on the face of the substrate film opposite to the face having the hard coat layer. As the adhesive constituting the adhesive layer, an adhesive for optical applications such as an acrylic adhesive, a urethane adhesive and a silicone adhesive can be preferably used. The thickness of the adhesive layer is, in general, in the range of 5 to 100 μm and preferably in the range of 10 to 60 μm.

A release film may be disposed on the adhesive layer. Examples of the release film include release films prepared by coating paper such as glassine paper, coated paper and laminate paper or a plastic film with a release agent such as a silicone resin. The thickness of the release film is not particularly limited. In general, the thickness of the release film is in the range of 20 to 150 μm.

To summarize the advantages of the present invention, the film for optical applications of the present invention is prepared in accordance with the wet process, exhibits the excellent property for preventing reflection of light in a wide range of wavelength and the excellent scratch resistance, has a simple construction, can be produced at a low cost and is advantageously used as a film for preventing reflection of light on image display devices such as PDP, CRT and LCD.

EXAMPLES

The present invention will be described more specifically with reference to examples in the following. However, the present invention is not limited to the examples.

The physical properties of the films for optical applications obtained in Examples and Comparative Examples were measured in accordance with the following methods.

(1) Bottom Reflectivity

The reflectivity of light in the range of the wavelength of 400 to 800 nm was measured using a spectrophotometer [manufactured by SHIMADZU Corporation; UV-3101PC]. The reflectivity at the wavelength showing the lowest reflectivity was used as the bottom reflectivity.

(2) Reflectivity at Wavelengths of 500 nm and 700 nm

The reflectivity of light at the wavelengths of 500 nm and 700 nm was measured using a spectrophotometer [manufactured by SHIMADZU Corporation; UV-3101PC].

(3) Scratch Resistance

The surface of a low refractivity layer was rubbed with steel wool #0000 under a load of $9.8 \times 10^{-3}$ N/mm$^2$ in five reciprocal movements and the condition of the surface was visually observed. The result was evaluated in accordance with the following criterion:

good: no scratches found on the surface poor: scratches found on the surface (4) Anti-glare Property (60° Gloss)

The 60° gloss was measured in accordance with the method of Japanese Industrial Standard K7105 using a gloss meter produced by NIPPON DENSHOKU KOGYO Co., Ltd.

(5) Antifouling Property (Contact Angle of Water)

Under the environment of a temperature of 23° C. and a relative humidity of 50%, a drop of pure water in a volume of 10 microliters was placed on the surface of an antifouling coating layer. After 1 minute, the contact angle of water was measured using a contact angle meter [manufactured by KYOWA KAIMEN KAGAKU Co., Ltd.; the CA-X type].

(6) Anti-static Property

A film for optical applications was left standing in a room for one month and the attachment of dusts was examined by visual observation. The result was evaluated in accordance with the following criterion:

good: no dusts attached to the surface poor: dusts attached to the surface

Example 1

(1) A polyethylene terephthalate (PET) film having a thickness of 188 μm [manufactured by TOYOBO Co., Ltd.; the trade name: A4100] was used as the substrate. The surface coated for enhancing adhesion of the film was coated with a fluid containing a hard coat material obtained by mixing 100 parts by weight of an acrylic hard coat resin of the ultraviolet light curing type [manufactured by JSR Corporation; the trade name: DESOLITE KZ7224; the concentration of the solid components: 46% by weight] and 390 parts by weight of a dispersion of tin oxide doped with antimony (the average particle diameter: 100 nm) [manufactured by ISHIIHARA TECHNO Co., Ltd.; the trade name: SN-100P (MEK); the concentration of solid components: 30% by weight] using a Mayer bar No. 12 in an amount such that the thickness of the film after being completely cured was 5 μm. After the formed layer was dried at 80° C. for 1 minute, the layer was irradiated with ultraviolet light in an amount of 200 mJ/cm$^2$ and cured and a hard coat layer having a refractive index of 1.65 was formed.

(2) A coating fluid was prepared by mixing 100 parts by weight of a siloxane-based antistatic agent [manufactured by COLCOAT Co., Ltd.; the trade name: COLCOAT P; the concentration of solid components: 2% by weight] and 30 parts by weight of a dispersion of porous silica (the specific gravity: 1.8 to 1.9; the refractive index: 1.34 to 1.36; the average particle diameter: about 50 nm) in a solvent [manufactured by CATALYSTS & CHEMICALS IND. Co., Ltd.; the trade name: ELCOM P-Special Product 3; the concentration of solid components: 10% by weight] and diluting the obtained mixture with isobutyl alcohol so that the concentration of solid components in the entire fluid was adjusted to 2% by weight.

The hard coat layer formed in step (1) described above was coated with the above coating fluid using a Mayer bar No. 6 in an amount such that the thickness of the film after being heated was 130 nm. The formed layer was treated by heating at 130° C. for 2 minute and a low refractivity layer containing the porous silica and the polysiloxane-based polymer and having a refractive index of 1.40 was formed.

The physical properties of the prepared film for optical applications are shown in Table 1.

It was confirmed that the above film for optical applications had small refractive indices with respect to light of 500 nm and 700 nm and exhibited the excellent anti-glare property to light in a wide range of wavelength.

Example 2

A film for optical applications was prepared in accordance with the same procedures as those conducted in Example 1 except that the preparation of the hard coat material in step (1) of Example 1 was changed as described in the following. The hard coat layer had a refractive index of 1.56.

The physical properties of the prepared film for optical applications are shown in Table 1.

<Preparation of a Hard Coat Material>

A polyester acrylic resin of the ultraviolet light curing type [manufactured by DAINICHI SEIKA KOGYO Co., Ltd.; the trade name: SEIKA BEAM EXF-01L(NS); the concentration of solid components: 100% by weight] in an amount of 100 parts by weight and 170 parts by weight of a dispersion of zinc antimonate [manufactured by NISSAN CHEMICAL INDUSTRIES, Ltd.; CELNAX CX-Z610M-FA; the concentration of solid components: 60% by weight] were mixed. The resultant mixture was diluted with isobutyl alcohol so that the concentration of solid components was adjusted to 30% by weight and a hard coat material was prepared.

Example 3

A film for optical applications was prepared in accordance with the same procedures as those conducted in Example 1 except that the preparation of the hard coat material in step (1) of Example 1 was changed as described in the following. The hard coat layer had a refractive index of 1.60.

The physical properties of the prepared film for optical applications are shown in Table 1.

<Preparation of a Hard Coat Material>

To 100 parts by weight of a polyester acrylate resin of the ultraviolet light curing type [manufactured by DAINICHI SEIKA KOGYO Co., Ltd.; the trade name: SEIKA BEAM EXF-01L(NS); the concentration of solid components: 100% by weight], 33 parts by weight of an acrylic resin of the ultraviolet light curing type containing silica gel [manufactured by DAINICHI SEIKA KOGYO Co., Ltd.; the trade name: SEIKA BEAM EXF-01L(BS); the concentration of solid components: 100% by weight] was added and 1,100 parts by weight of a dispersion of tin oxide doped with antimony [manufactured by ISHIHARA TECHNO Co., Ltd.; the trade name: SN-100P (MEK); the concentration of solid components: 30% by weight] was added to the obtained mixture. To the resultant mixture, methyl isobutyl ketone was added as the diluting solvent so that the concentration of solid components in the entire mixture was adjusted to 30% by weight and a hard coat material was prepared.

Example 4

A film for optical applications was prepared in accordance with the same procedures as those conducted in Example 1 except that an antifouling coating material was prepared by diluting a fluorine-based resin [manufactured by DAIKIN KOGYO Co., Ltd.; the trade name: OPTOOL DSX; the concentration of solid components: 20% by weight] with a diluent specific for the fluorine-based resin [manufactured by DAIKIN KOGYO Co., Ltd.; the trade name: DEMNAM SOLVENT] so that the concentration of the fluorine-based resin was adjusted to 0.12% by weight and an antifouling coating layer was formed on the low refractivity layer formed in step (2) of Example 1 by applying the prepared antifouling coating material using a Mayer bar No. 4 in an amount such that the formed layer had a thickness of about 5 nm after being dried, followed by drying the coating layer. The physical properties of the prepared film for optical applications are shown in Table 1.

Example 5

A film for optical applications was prepared in accordance with the same procedures as those conducted in Example 1 except that the preparation of the hard coat material in step (1) of Example 1 was changed as described in the following. The hard coat layer had a refractive index of 1.63.

The physical properties of the prepared film for optical applications are shown in Table 1.

<Preparation of a Hard Coat Material>

A silicone-based hard coat material of the thermosetting type [NIPPON DACT SHAMROCK Co., Ltd.; the trade name: SOLGUARD NP-730-0.2X; the concentration of solid components: 25% by weight] in an amount of 100 parts by weight and 233 parts by weight of a dispersion of tin oxide doped with antimony [manufactured by ISHIHARA TECHNO Co., Ltd.; the trade name: SN-100P (IBA); the concentration of solid components: 30% by weight] were mixed and a hard coat material was prepared.

The hard coat layer was formed after curing by heating at 130° C. for 3 minutes.

Comparative Example 1

A film for optical applications was prepared in accordance with the same procedures as those conducted in Example 1 except that the low refractivity layer formed in step (2) of Example 1 was not formed. The physical properties of the prepared film for optical applications are shown in Table 1.

Comparative Example 2

A film for optical applications was prepared in accordance with the same procedures as those conducted in Example 1 except that, in step (2) of Example 1, the siloxane-based antistatic agent [manufactured by COLCOAT Co., Ltd.; the trade name: COLCOAT P; the concentration of solid components: 2% by weight] was used alone without using the porous silica. The refractive index of the coating layer was 1.46. The physical properties of the prepared film for optical applications are shown in Table 1.

Comparative Example 3

A film for optical applications was prepared in accordance with the same procedures as those conducted in Example 1 except that, in step (1) of Example 1, the acrylic hard coating material of the ultraviolet light curing type [manufactured by JSR Corporation; the trade name: DESOLITE KZ7224; the concentration of solid components: 46% by weight] was used alone without using tin oxide doped with antimony. The refractive index of the hard coat layer was 1.52. The physical properties of the prepared film for optical applications are shown in Table 1.

Comparative Example 4

A film for optical applications was prepared in accordance with the same procedures as those conducted in Example 1 except that, in step (2) of Example 1, 10 parts by weight of a dispersion of an ordinary silica sol (the specific gravity of silica particles: 2.1; the refractive index: 1.46; the average particle diameter: about 30 nm) [manufactured by CATALYSTS & CHEMICALS IND. Co., Ltd.; OSCAL 1632; the concentration of solid components: 30% by weight] was used in place of the porous silica. The refractive index of the coating layer was 1.46. The physical properties of the prepared film for optical applications are shown in Table 1.

TABLE 1

|  | Bottom reflectivity/ wavelength (%)/(nm) | Reflectivity at 500 nm (%) | Reflectivity at 700 nm (%) | Steel wool hardness | Antiglare property [60° gloss] | Antifouling property [contact angle of water] (degree) | Antistatic property |
|---|---|---|---|---|---|---|---|
| Example 1 | 1.05/580 | 2.6 | 1.7 | good | 156 | 70 | good |
| Example 2 | 1.20/600 | 2.8 | 1.8 | good | — | — | good |
| Example 3 | 1.85/560 | 3.4 | 2.7 | good | 80 | — | good |
| Example 4 | 0.95/600 | 2.5 | 1.5 | good | — | 118 | good |
| Example 5 | 1.10/580 | 2.6 | 1.8 | good | — | — | good |
| Comparative Example 1 | — | 5.1 | 5.2 | good | — | — | poor |
| Comparative Example 2 | 2.20/590 | 3.9 | 3.5 | good | — | — | good |

TABLE 1-continued

|  | Bottom reflectivity/ wavelength (%)/(nm) | Reflectivity at 500 nm (%) | Reflectivity at 700 nm (%) | Steel wool hardness | Anti-glare property [60° gloss] | Antifouling property [contact angle of water] (degree) | Antistatic property |
|---|---|---|---|---|---|---|---|
| Comparative Example 3 | 1.40/590 | 3.5 | 3.0 | poor | — | — | good |
| Comparative Example 4 | 2.25/580 | 3.6 | 3.4 | good | — | — | good |

What is claimed is:

1. A film for optical applications comprising (A) a hard coat layer which comprises (i) at least one metal oxide selected from the group consisting of tin oxide doped with antimony and zinc antimonate and (ii) a substance cured by heat or by an ionizing radiation, the hard coat layer having a thickness in a range of 2 to 20 μm and (B) a low refractivity layer which comprises porous silica and a polysiloxane-based polymer, the low refractivity layer having a refractive index in a range of 1.30 to 1.45 and a thickness in a range of 40 to 200 nm, layers (A) and (B) being successively laminated on at least one face of a substrate film.

2. A film according to claim 1, wherein the porous silica in layer (B) has a specific gravity of 1.7 to 1.9, a refractive index of 1.30 to 1.36 and an average particle diameter of 30 to 80 nm.

3. A film according to claim 1, wherein the hard coat layer of layer (A) is a hard coat layer having an anti-glare property.

4. A film according to claim 1, wherein the low refractivity layer of layer (B) has a antistatic property.

5. A film according to claim 1, which further comprises (C) an antifouling coating layer disposed on layer (B).

6. A film according to claim 5, wherein the antifouling coating layer comprises a fluorine-based resin.

7. A film according to claim 1, wherein the hard coat layer (A) comprises a substance cured by an ionizing radiation.

8. A film according to claim 2, wherein the hard coat layer (A) comprises a substance cured by an ionizing radiation.

9. A film according to claim 1, wherein the hard coat layer (A) has a refractive index in a range of 1.50 to 1.75.

10. A film according to claim 8, wherein the hard coat layer (A) has a refractive index in a range of 1.50 to 1.75.

11. A film according to claim 1, wherein the substrate film is a polyester film.

12. A film according to claim 11, wherein the polyester film is a polyethylene terephthalate film.

13. A film according to claim 1, wherein the metal oxide is tin oxide doped with antimony.

14. A film according to claim 10, wherein the metal oxide is tin oxide doped with antimony.

15. A film according to claim 14, wherein the substrate film is a polyester film.

16. A film according to claim 15, which further comprises (C) an antifouling coating layer disposed on layer (B).

17. A film according to claim 16, wherein the antifouling coating layer comprises a fluorine-based resin.

18. A film according to claim 17, wherein the polyester film is a polyethylene terephthalate film.

19. A film according to claim 1, wherein the metal oxide is in an amount of 1 to 4 parts by weight per 1 part by weight of the substance cured by heat or by an ionizing radiation.

20. A film according to claim 1, wherein the metal oxide is zinc antimonate.

* * * * *